UNITED STATES PATENT OFFICE.

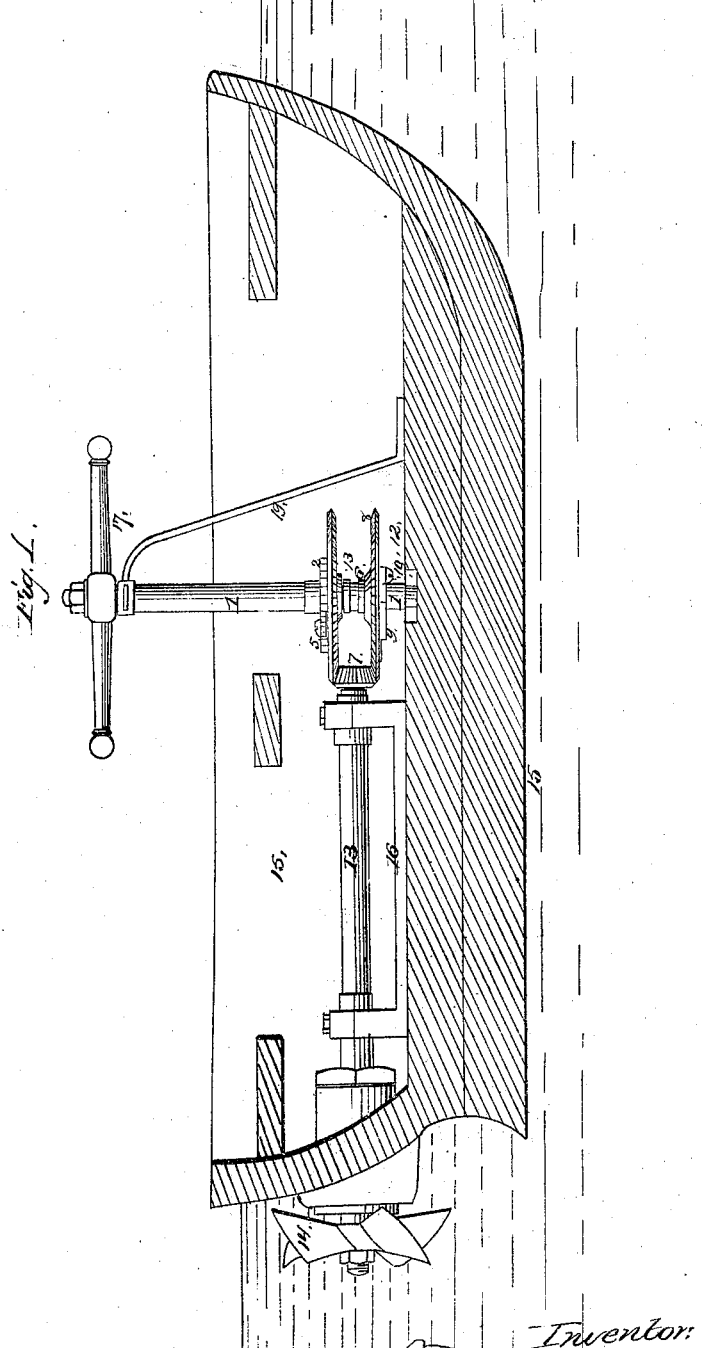

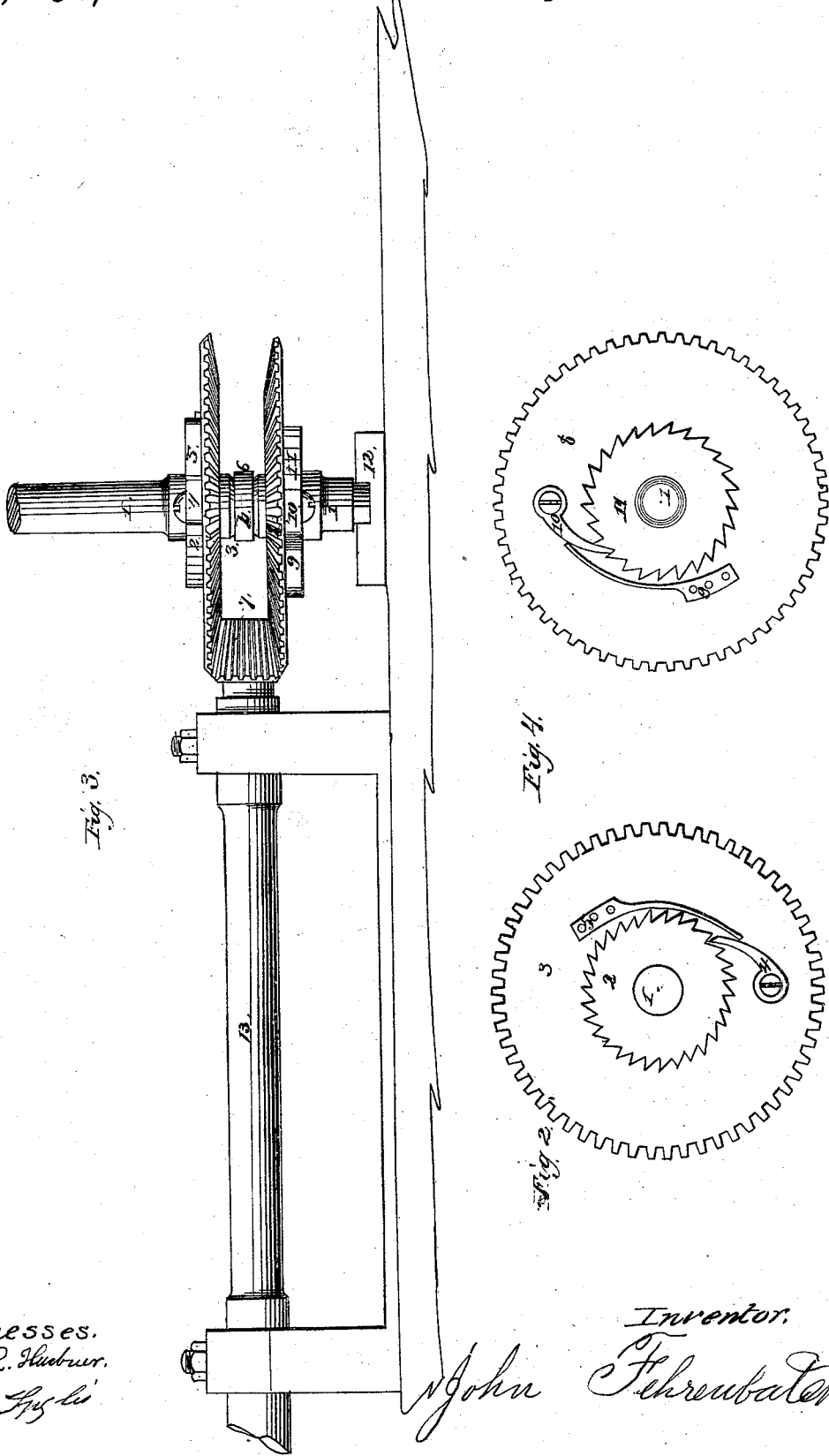

JOHN FEHRENBATCH, OF INDIANAPOLIS, INDIANA.

IMPROVED HAND-PROPELLER FOR SMALL BOATS.

Specification forming part of Letters Patent No. 58,083, dated September 18, 1866.

*To all whom it may concern:*

Be it known that I, JOHN FEHRENBATCH, of Indianapolis, Marion county, and State of Indiana, have invented a new and useful Mode of Propelling Small Boats by Lever-Power; and I do hereby declare that the following is a full, clear, and exact description of the same, reference being had to the annexed drawings, making part of the same, and to the letters of reference marked thereon, of which—

Figure 1 represents a longitudinal section of the boat. Fig. 2 represents the upper bevel-wheel, 3, with the ratchet 2, dog 4, and spring 5. Fig. 4 represents the lower bevel-wheel, 8, with ratchet 11, dog 10, and spring 9. Fig. 3 represents the combination of the upper and lower bevel-wheels, 3 and 8, with their ratchets 2 and 11, dogs 4 and 10, and springs 5 and 9, attached to the upright shaft 1, which receives its motive power from the lever 17, which works right and left. 6 is a washer between the bevel-wheels. 7 is pinion attached to shaft 13, and 14 is the screw. 12 is the step in which the lower journal of the upright shaft 1 runs. 15 is the wood-work of the boat. 16 is the frame or bed of machinery, and 19 is a brace to steady the shaft 1.

If the motion of the lever 17 is to the right, the power is conveyed to the bevel-wheel 3 by means of the ratchet 2 and dog 4. This motion is transferred to the pinion 7, which is attached to the parallel shaft 13, and from it to the screw 14. While the motion of the lever is to the right the lower bevel-wheel receives its motion from the pinion 7, and the dog 10 will slip around the ratchet 11. When the motion of the lever is to the left the lower bevel-wheel, 8, receives its motion from the lower ratchet, 11, which is fastened to the upright shaft 1 by means of the dog 10, conveying the motion of the pinion 7 and shaft 13 in the same way as the bevel-wheel 3 does when the lever is turned to the right. While the motion is to the left the dog 4 of the upper bevel-wheel, 3, will slide over the ratchet 2, as the dog 10 does when the motion of the lever is to the right.

It will now be seen that the screw 14 continually receives its motion in one direction only, no matter what way the lever 17 is turned. It may be turned left or right, or clear around; the motion communicated to the screw will be the same.

What I claim, and desire to secure by Letters Patent of the United States, is—

The combination of the bevel-wheels 3 and 8, the ratchets 2 and 11, the dogs 4 and 10, and springs 5 and 9 with the upright shaft 1 and lever 17, and with the pinion 7 on shaft 13, which propels the screw, all applied for the purpose of propelling small boats.

JOHN FEHRENBATCH.

Witnesses:
 HENRY R. HUEBNER,
 ALEX. INGLES.